(12) United States Patent
Trice et al.

(10) Patent No.: US 7,757,591 B2
(45) Date of Patent: Jul. 20, 2010

(54) ALIGNED MULTI-DIAMOND CUTTING TOOL ASSEMBLY FOR CREATING MICROREPLICATION TOOLS

(75) Inventors: Jennifer L. Trice, Hugo, MN (US); Charles N. Devore, Hugo, MN (US); Alan B. Campbell, Santa Rosa, CA (US); Dale L. Ehnes, Cotati, CA (US)

(73) Assignee: 3M Innovative Properties Company, Saint Paul, MN (US)

( * ) Notice: Subject to any disclaimer, the term of this patent is extended or adjusted under 35 U.S.C. 154(b) by 677 days.

(21) Appl. No.: 11/253,496

(22) Filed: Oct. 19, 2005

(65) Prior Publication Data

US 2007/0084315 A1    Apr. 19, 2007

(51) Int. Cl.
*B23B 27/20* (2006.01)
*B26D 1/00* (2006.01)

(52) U.S. Cl. .................................. 82/1.11; 407/113

(58) Field of Classification Search ............... 82/111, 82/1.11; 29/527.3; 359/530; 409/132, 131; 58/294; 407/119, 113–116; 83/697, 862, 83/861, 851

See application file for complete search history.

(56) References Cited

U.S. PATENT DOCUMENTS

| | | | |
|---|---|---|---|
| 3,813,970 A * | 6/1974 | Mitchell | 82/158 |
| 3,893,356 A * | 7/1975 | Atzberger | 82/158 |
| 4,113,266 A | 9/1978 | Alexandrovich | |
| 4,113,267 A | 9/1978 | Wittenberg | |
| 4,231,275 A * | 11/1980 | Onishi | 83/862 |
| 4,294,586 A | 10/1981 | Cox, Jr. | |
| 4,318,648 A | 3/1982 | Deprez et al. | |
| 4,352,309 A * | 10/1982 | Thalstrom et al. | 83/697 |
| 5,203,950 A * | 4/1993 | Spoelders | 156/506 |
| 5,316,416 A | 5/1994 | Kim | |
| 5,325,748 A | 7/1994 | Ehrenberg | |
| 5,663,802 A | 9/1997 | Beckett et al. | |
| 5,676,505 A * | 10/1997 | Gauss et al. | 409/132 |
| 6,325,575 B1 | 12/2001 | Pawlik | |
| 6,474,204 B1 | 11/2002 | Suzuki et al. | |
| 6,599,178 B1 | 7/2003 | Gluche et al. | |
| 6,755,598 B2 | 6/2004 | Rowland et al. | |
| 7,140,812 B2 * | 11/2006 | Bryan et al. | 407/119 |
| 2003/0223830 A1 | 12/2003 | Bryan et al. | |
| 2004/0045419 A1 * | 3/2004 | Bryan et al. | 83/13 |

FOREIGN PATENT DOCUMENTS

| | | |
|---|---|---|
| EP | 0 830 946 B1 | 3/1998 |
| JP | 2002/307210 | 10/2002 |
| JP | 2004/42188 | 2/2004 |

* cited by examiner

*Primary Examiner*—Will Fridie, Jr.

(57) ABSTRACT

The disclosure is directed to a cutting tool assembly used for creating grooves in a microreplication tool. The cutting tool assembly includes a mounting structure and multiple diamonds aligned in the mounting structure to a tolerance of less than 10 microns. For example, first and second tool shanks having first and second diamond tips can be positioned in the mounting structure such that a cutting location of the first diamond tip is identical to a cutting location of the second diamond tip. However, the second diamond tip may be a defined distance further away from the mounting structure than the first diamond tip, or the second diamond tip may have a different shape than the first diamond tip. In this manner, the first diamond tip may cut a groove into a work piece and the second diamond tip may cut a sub-feature into the groove to create a multi-featured groove.

23 Claims, 14 Drawing Sheets

ALIGNED MULTI-DIAMOND CUTTING TOOL ASSEMBLY FOR CREATING MICROREPLICATION TOOLS

TECHNICAL FIELD

The invention relates to diamond machining of microreplication tools used in creating microreplicated structures.

BACKGROUND

Diamond machining techniques can be used to create a wide variety of work pieces such as microreplication tools. Microreplication tools are commonly used for extrusion processes, injection molding processes, embossing processes, casting processes, or the like, to create microreplicated structures. The microreplicated structures may comprise optical films, abrasive films, adhesive films, mechanical fasteners having self-mating profiles, or any molded or extruded parts having microreplicated features of relatively small dimensions, such as dimensions less than approximately 1000 microns.

Microreplication tools include casting belts, casting rollers, injection molds, extrusion or embossing tools, and the like. Microreplication tools can be created by a diamond machining process in which a cutting tool assembly is used to cut grooves or other features into the microreplication tool. The process of creating a microreplication tool using a cutting tool assembly can be costly and time consuming.

SUMMARY

In general, the invention is directed to cutting tool assemblies that include multiple diamonds aligned along a cutting direction. The cutting tool assembly having multiple diamonds aligned along a cutting direction can be used in creating microreplication tools or other work pieces. In particular, the multiple diamonds of the cutting tool assembly can be used to create deep grooves through multiple cuts, multi-featured grooves or other features in a microreplication tool during a single cutting pass of the assembly. With the ability to form a multi-featured groove in a single cutting pass, a cutting tool assembly with multiple diamonds can reduce production time and/or create more complex patterns.

The cutting tool assembly may include a mounting structure and multiple tool shanks mounted in the mounting structure. Each of the tool shanks can define a diamond tip used as a cutting tip of the cutting tool assembly. The diamond cutting tips of the tool shanks may be precisely formed to correspond to sub-features of a groove to be created in the microreplication tool. Moreover, the tool shanks may be precisely aligned in the mounting structure and positioned to different heights so that each depth or feature can be cut into the microreplication tool. Accordingly, the different diamond tips of the cutting tool assembly may correspond to different sub-features of the grooves to be created in the microreplication tool.

In one embodiment, the disclosure provides a cutting tool assembly comprising a mounting structure, a first tool shank mounted in the mounting structure, the first tool shank defining a first diamond tip defining a width less than 1 mm, and a second tool shank mounted in the mounting structure, the second tool shank defining a second diamond tip defining a width less than 1 mm, wherein the first and second tool shanks are positioned in the mounting structure such that the first and second diamond tips are aligned in a cutting direction of the cutting tool assembly to within a tolerance of less than 10 microns.

In another embodiment, the disclosure provides a method comprising mounting a first tool shank in a mounting structure, the first tool shank defining a first diamond tip defining a width less than 1 mm, mounting a second tool shank in the mounting structure, the second tool shank defining a second diamond tip defining a width less than 1 mm, and aligning the first and second tool shanks in the mounting structure such that the first and second diamond tips are aligned in a cutting direction of the first and second diamond tips to within a tolerance of less than 10 microns.

In an alternative embodiment, the disclosure provides a cutting tool assembly comprising a mounting structure and a tool shank mounted in the mounting structure, the tool shank defining a first diamond tip defining a width less than 1 mm and a second diamond tip defining a width less than 1 mm, and wherein the first and second diamond tips are aligned in a cutting direction of the cutting tool assembly.

By using multiple aligned diamond cutting tips in the same assembly, the creation of the microreplication tool may be improved or simplified. In particular, fewer cutting passes of the cutting tool assembly may be needed to cut deep grooves in the microreplication tool, which can reduce tooling costs. For example, if the cutting tool assembly includes two diamonds, the first diamond may create a groove and the second diamond may deepen the groove. The number of passes required to cut the deep groove in the microreplication tool can be reduced by one-half.

In addition, in some embodiments, the different diamond tips may define different sub-features and create complex grooves of the microreplication tool. In that case, the use of different cutting tool assemblies to create two or more physically distinct features of the groove may be avoided, and a single assembly can be used instead to create two or more physically distinct sub-features of the groove in the microreplication tool. Such techniques may improve the quality of the microreplication tool and can reduce the time and costs associated with the creation of the microreplication tool, which in turn, may effectively reduce the costs associated with the ultimate creation of microreplicated structures. Aligning each diamond tip to tolerances less than 1 micron enable multiple aligned diamond cutting tips to create multi-featured grooves without noticeable variation.

Additional details of these and other embodiments are set forth in the accompanying drawings and the description below. Other features, objects and advantages will become apparent from the description and drawings, and from the claims.

DETAILED DESCRIPTION

Figure 1:
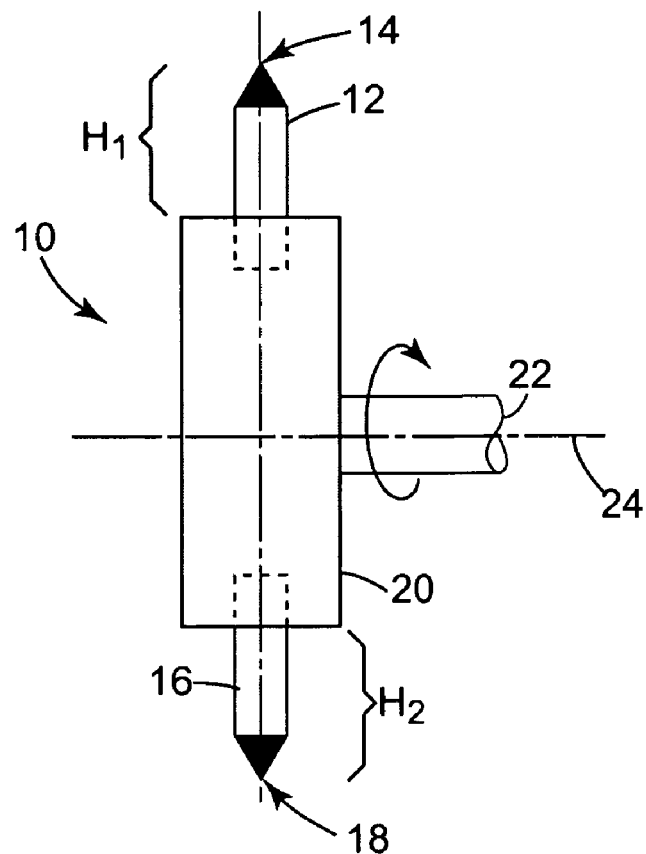
FIG. 1 is a top view of a multi-diamond cutting tool assembly configured for fly-cutting.

FIG. 1 is a top view of a cutting tool assembly 10 that includes two tool shanks 12 and 16 mounted in a mounting structure 20. Cutting tool assembly 10 is configured for fly-cutting in which assembly 10 is rotated about an axis 24. For example, assembly 10 may be mountable to a drive shaft 22, which can be driven by a motor of a tooling machine (not shown) to rotate assembly 10. Mounting structure 20 may comprise a structure for holding tool shanks 12 and 16 that include diamond tips 14 and 18, respectively. The shanks 12 and 16 may be formed from a metallic or composite material, and diamonds can be secured to shanks 12 and 16 by a substantially permanent securing mechanism. In addition, mounting structure 20 may include features to enable attachment to drive shaft 22.

In order to secure the diamonds in tool shanks 12 and 16 and thereby define diamond tips 14 and 18, a substantially permanent securing mechanism can be used such as, brazing, soldering, an adhesive such as an epoxy, or the like. The tool shanks 12 and 16 with diamond tips 14 and 18 are then be mounted in mounting structure 20 via a temporary securing mechanism such as one or more bolts, clamps or set screws. Alternatively, brazing, soldering, an adhesive such as an epoxy, or another more permanent securing mechanism may be used to secure tool shanks 12 and 16 in mounting structure 20. In any case, the use of a tooling microscope with positioning controls and positioning feedback may ensure that tool shanks 12 and 16 are positioned within mounting structure 20 such that diamond tips 14 and 18 are positioned at a height relative to one another with the precision required for effective manufacture of microreplication tools. In some cases, the aligned tips 14 and 18 may be positioned at the same height. The second tip 18 may create a different feature than tip 14 because the differing shapes between tips 14 and 18.

Mounting structure 20 may have a shape that allows cutting tool assembly 10 to be inserted into a diamond tooling machine. Again, the diamond tooling machine may be a diamond turning machine configured for fly-cutting in which the cutting tool assembly is rotated about an axis via drive shaft 22.

Each diamond tip 14 and 18 of tool shanks 12 and 16, respectively, defines a separate cutting mechanism that defines the creation of a groove depth or distinct feature of a groove in a work piece such as a microreplication tool being created. The groove represents any combination of features created by tips 14 and 18 in the same linear position on the work piece. For example, the first diamond tip 14 may create the groove followed by the diamond tip 18 that may deepen the groove or create a sub-feature in the groove. The increased height of diamond tip 18 enables the deeper cut or sub-feature to be created further into the surface of the work piece. While the created groove is referred to as a multi-featured groove herein, the groove may include more than one feature. A groove with a depth that was achieved with more than one tip will be referred to as a deep groove. In some cases, one groove may be a combination of deeper cuts and sub-features. In other embodiments, diamond tip 18 may create a sub-feature overlapping the groove created by diamond tip 14. In any case, the multi-featured groove must consist of one continuous edge within the work piece. The work piece may be constructed of copper, nickel, aluminum, plastic such as acrylic, or any material capable of being machined.

In the embodiment illustrated in FIG. 1, cutting tool assembly 10 includes two tool shanks 12 and 16, each having one diamond tip 14 and 18, although additional tool shanks with diamond tips may be used in accordance with the principles of the invention. In addition, the principles described below may be extended for use with diamonds that define more than one cutting tip per diamond.

As illustrated in FIG. 1, tool shanks 12 and 16 are positioned in mounting structure 20 such that diamond tip 14 and diamond tip 18 are aligned in the same plane parallel to a cutting direction. In this position, tip 14 and tip 18 will be contributing to the same groove in consecutive passes through the work piece.

The vertical position of diamond tips 14 and 18 may be different with respect to axis 24. The height of diamond tip 14 above the surface of mounting structure 20 is defined as H1 and the height of diamond tip 18 above the surface of the mounting structure is defined as H2. The difference between H1 and H2 represents the increased depth D2 diamond tip 18 cuts into the work piece over depth D1 of diamond tip 14. The depth D2 may be less than 10 microns. In the embodiment of FIG. 1, H2 is greater than H1. However, H1 may equal H2 in other embodiments. When H1 and H2 are equal, the tip 18 may include a different shape than tip 14 to create a sub-feature in the groove. Alternatively, diamond tip 18 may simply follow the path of diamond tip 14 and clean any areas left from diamond tip 14.

Figure 2:
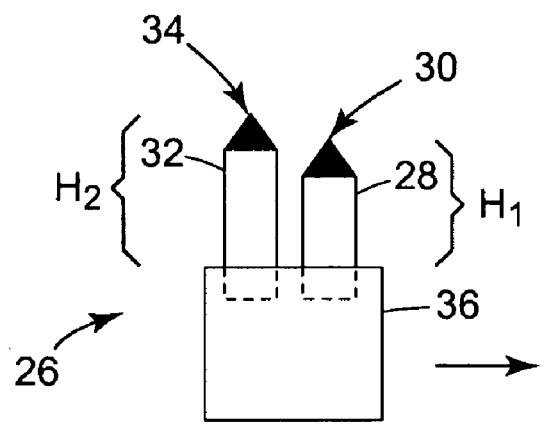
FIG. 2 is a side view of a multi-diamond cutting tool assembly configured for plunge or thread cutting.

FIG. 2 is a side view of a multi-diamond cutting tool assembly configured for plunge or thread cutting. In plunge cutting, cutting tool assembly 26 is plunged into a moving work piece at defined locations for intervals of time before moving to other locations to cut various grooves. Thread cutting is similar to plunge cutting. However, in thread cutting, cutting tool assembly 26 is displaced into a moving work piece for longer periods of time to cut long threaded grooves. Cutting tool assembly 26 may also be used for scribing or ruling, in which case cutting tool assembly 26 is displaced through a work piece very slowly.

Like assembly 10 of FIG. 1, cutting tool assembly 26 of FIG. 2 includes multiple tool shanks 28 and 32 secured within a mounting structure 36. In order to secure the diamonds in tool shanks 28 and 32 and thereby define diamond tips 30 and 34, a substantially permanent securing mechanism can be used such as, brazing, soldering, an adhesive such as an epoxy, or the like. The tool shanks 28 and 32 with diamond tips 30 and 34 may then be mounted in mounting structure 36 via a temporary securing mechanism such as one or more bolts, clamps or set screws. Alternatively brazing, soldering, an adhesive such as epoxy, or another more permanent securing mechanism may be used to secure tool shanks 28 and 32 in mounting structure 36.

The use of a tooling microscope with positioning feedback can ensure that diamond tips 30 and 34 of tool shanks 28 and 32 are positioned within mounting structure 36 with the precision required for effective tooling of microreplication tools. Mounting structure 36 may have a shape that allows cutting tool assembly 26 to be inserted into a diamond tooling machine configured for plunge cutting, thread cutting, scribing or ruling.

Similar to FIG. 1, each diamond tip 30 and 34 of tool shanks 28 and 32, respectively, defines a separate cutting mechanism that defines the creation of a deeper groove or distinct sub-feature of a groove in a work piece such as a microreplication tool being created. The groove represents any combination of grooves and sub-features created by tips 30 and 34 in the same linear position on the work piece. For example, diamond tip 30 may create a groove followed by diamond tip 34 that may create a sub-feature in the groove or simply deepen the groove of tip 30. The increased height of diamond tip 34 enables the groove or sub-feature to be created further into the surface of the work piece. While the groove with a sub-feature is referred to as a multi-featured groove herein, the groove created by multiple depths is a deep groove. In other embodiments, diamond tip 34 may create a sub-feature overlapping the groove created by diamond tip 30. In any case, the multi-featured or deep groove must consist of one continuous edge within the work piece that creates the side profile of the groove.

In the embodiment illustrated in FIG. 2, cutting tool assembly 26 includes two tool shanks 28 and 32, each having one diamond tip 30 and 34, although additional tool shanks with diamond tips may be used in accordance with the principles of the invention. In addition, the principles described below may be extended for use with diamonds that define more than one cutting tip per diamond.

As illustrated in FIG. 2, tool shanks 28 and 32 are positioned in mounting structure 36 such that diamond tip 30 and diamond tip 34 are aligned in the same plane parallel to a cutting direction. In this position, tip 30 and tip 34 contribute to the same groove in consecutive passes through the work piece. The work piece may be constructed of copper, nickel, aluminum, plastic such as acrylic, or any material capable of being machined.

The vertical position of diamond tips 30 and 34 may be different with respect to the surface of mounting structure 36. The height of diamond tip 30 above the surface of mounting structure 36 is defined as H1, and the height of diamond tip 34 above the surface of the mounting structure is defined as H2. The difference between H1 and H2 represents the increased depth D2 diamond tip 34 cuts into the work piece over depth D1 created by diamond tip 30. The depth D2 may be less than 10 microns. In the embodiment of FIG. 1, H2 is greater than H1. However, H1 may equal H2 in other embodiments. When H1 and H2 are equal, tip 34 may include a different shape than tip 30 to create a sub-feature in the groove. Alternatively, diamond tip 34 may simply follow the path of diamond tip 30 and clean any areas left from diamond tip 30.

Figure 3:
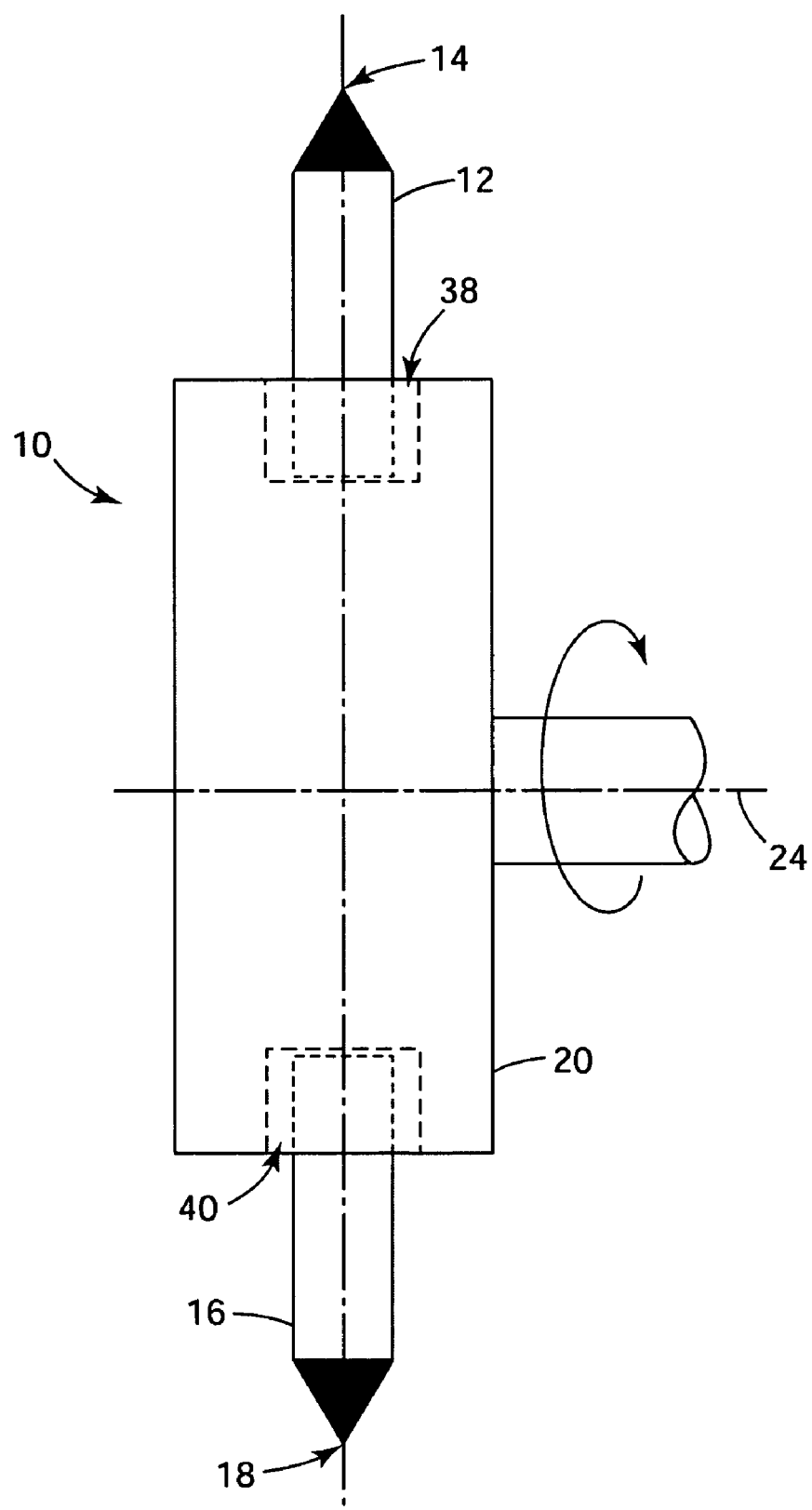
FIG. 3 is a more detailed top cross-sectional view of one embodiment of a multi-diamond cutting tool assembly configured for fly-cutting.

FIG. 3 is a more detailed top cross-sectional view of cutting tool assembly 10 configured for fly-cutting. Mounting structure 20 includes areas 38 and 40 to receive respective tool shanks 12 and 16. Areas 38 and 40 are slightly larger than the respective tool shanks 12 and 16 in order to ensure that the tool shanks can be moved within the areas to properly position the diamond tips before the shanks are fixed in place. In some embodiments, one or more spacers may be placed within areas 38 or 40 to correctly position tool shanks 12 and 16.

In order to position tool shanks 12 and 16 within mounting structure 20, a tooling microscope can be used. The microscope can be used to identify and measure the position of the diamond tips relative to one another so that the tool shanks can be properly positioned within the mounting structure. Positioning feedback can be provided to quantify the positioning of the diamond tips, e.g., in the form of a digital readout, analog readout, graphic display, or the like. The feedback can be used to precisely position the different tool shanks in the mounting structure. For example, a Nikon Tool Maker's Microscope commercially available from Fryer Company of Edina, Minn. includes controlling dials for micro-measuring distances of the diamond cutting tips of tool shanks relative to one another. Moreover, feedback of the positioning can be provided and quantified by a Quadra Chex 2000 digital readout device, commercially available from Metronics Inc. of Manchester N.H., in order to ensure that diamond tips 14 and 18 are aligned and positioned to the appropriate height within the accuracy required for effective creation of microreplication tools. The use of Nikon Tool Maker's Microscope and the Quadra Chex 2000 digital readout device can measure precision alignment of tool shanks 12 and 16 within the mounting structure such that diamond tips associated with the tool shanks are positioned relative to one another to within tolerances on the order of 0.5 microns.

In particular, achieving alignment of the diamond tips to tolerances less than 10 microns, and more preferably less than 1 micron is desirable to create effective microreplication tools that can be used to create optical films, mechanical fasteners, abrasive films, adhesive films or the like. This micro-positioning can be achieved both laterally and vertically so that the diamond tips are correctly aligned to one another to create one groove, and vertically relative to one another to ensure desired cutting heights for the respective tips to create the correct depth of the groove. Both lateral and vertical positioning can be achieved to within the tolerances described herein. Once properly positioned under the microscope using the digital readout, tool shanks 12 and 16 are secured into the mounting structure via one or more bolts, clamps, or set screws. Alternatively, brazing, soldering, an adhesive such as an epoxy, or any other securing mechanism can be used.

Figure 4:
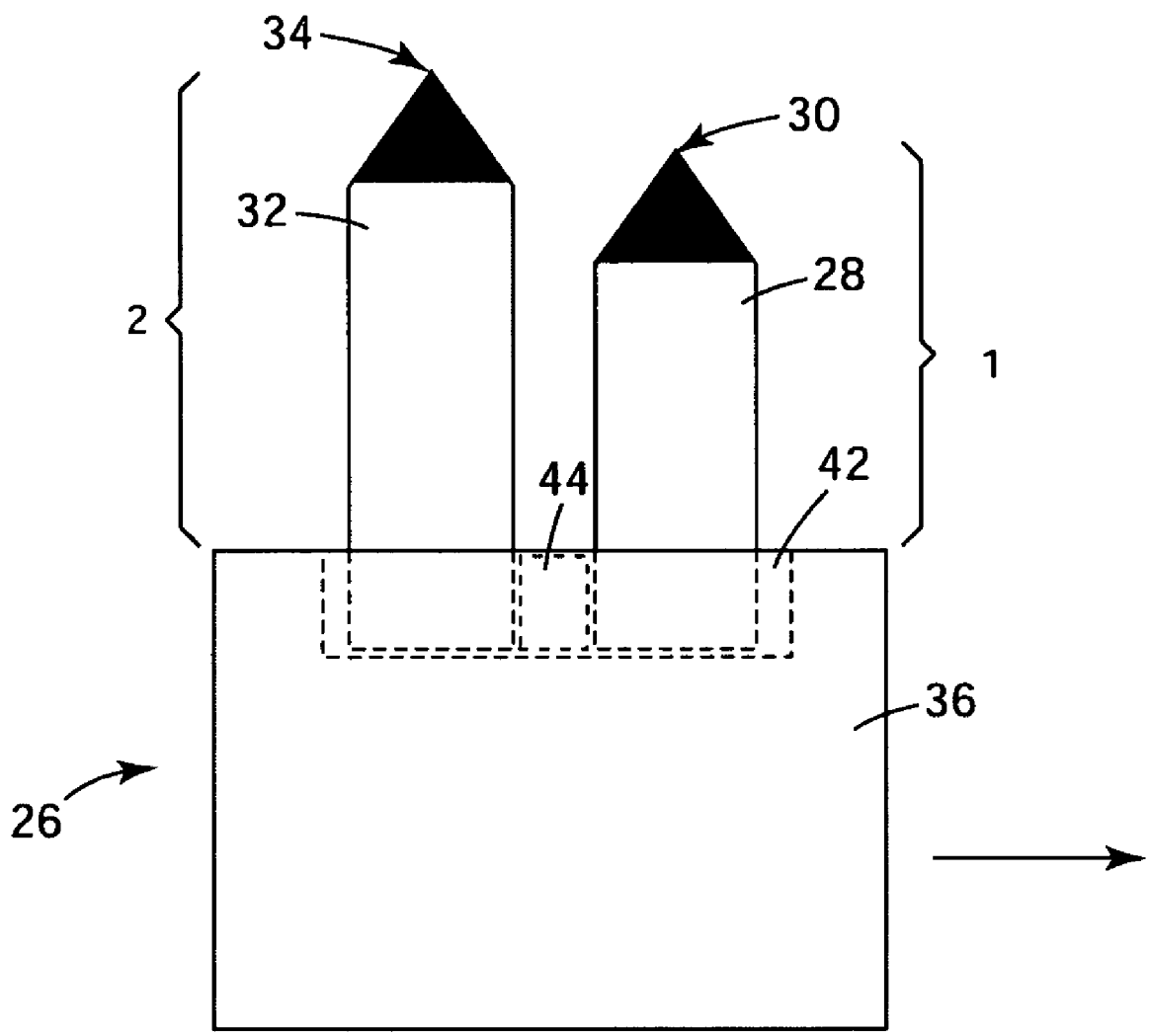
FIG. 4 is a more detailed side cross-sectional view of one embodiment of a multi-diamond cutting tool assembly configured for plunge or thread cutting.

FIG. 4 is a more detailed side cross-sectional view of cutting tool assembly 26 configured for plunge or thread cutting. Mounting structure 36 includes area 42 to receive tool shanks 28 and 32. Area 42 is slightly larger than tool shanks 28 and 32 in order to ensure that the tool shanks can be moved within the areas to properly position the diamond tips before the shanks are fixed in place. One or more spacers 44 may also be positioned in area 42 to correctly position tool shanks 12 and 16.

In some embodiments, mounting structure 36 may include more than one area 42 to receive tool shanks. For example, each tool shank may be placed in a respective area, or any number of areas may receive a plurality of tool shanks for cutting a groove or sub-feature associated with each tool shank.

In order to position tool shanks 28 and 32 within mounting structure 36, a tooling microscope can be used similar to the microscope in FIG. 3. For example, a Nikon Tool Maker's Microscope commercially available from Fryer Company of Edina, Minn. includes controlling dials for micro-measuring distances of the diamond cutting tips of tool shanks relative to one another. Moreover, feedback of the positioning can be provided and quantified by a Quadra Chex 2000 digital readout device, commercially available from Metronics Inc. of Manchester N.H., in order to ensure that diamond tips 30 and 34 are aligned and positioned to the appropriate height within the accuracy required for effective creation of microreplication tools. The use of Nikon Tool Maker's Microscope and the Quadra Chex 2000 digital readout device can measure precision alignment of tool shanks 28 and 32 within the mounting structure such that diamond tips associated with the tool shanks are positioned relative to one another to within tolerances on the order of 0.5 microns.

In particular, achieving alignment of the diamond tips to tolerances less than 10 microns, and more preferably less than 1 micron is desirable to create effective microreplication tools that can be used to create optical films, mechanical fasteners, abrasive films, adhesive films or the like. This micro-positioning can be achieved both laterally and vertically so that the diamond tips are correctly aligned to one another to create one groove, and vertically relative to one another to ensure desired cutting heights for the respective tips to create the correct depth of the groove. Both lateral and vertical positioning can be achieved to within the tolerances described herein. Once properly positioned under the microscope using the digital readout, tool shanks 28 and 32 are secured into the mounting structure via one or more bolts, clamps, or set screws. Alternatively, brazing, soldering, an adhesive such as an epoxy, or any other securing mechanism can be used.

Figure 5:
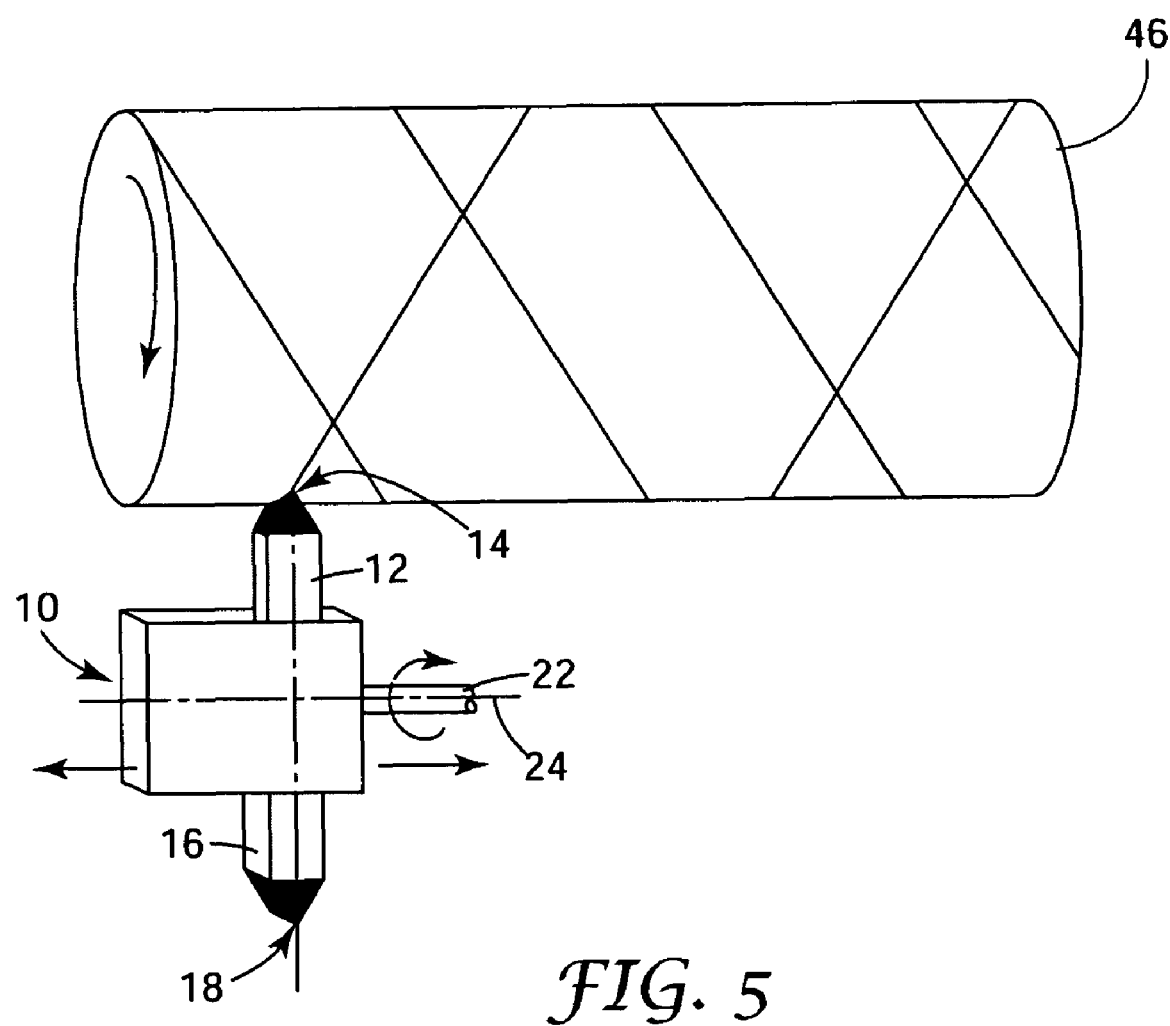
FIG. 5 is a conceptual perspective view of a multi-diamond fly cutting tool assembly cutting one groove during the creation of a microreplication tool.

FIG. 5 is a conceptual perspective view of a multi-diamond fly cutting tool assembly 10 cutting a groove during the creation of a microreplication tool 46. In the example of FIG. 5, the respective microreplication tool 72 comprises a casting roll, although other microreplication tools such as casting belts, injection molds, extrusion or embossing tools, or other work pieces could also be created using cutting tool assembly 10. Cutting tool assembly 10 may be secured to a drive shaft 22 which is attached to a motor (not shown) to rotate cutting tool assembly 10 about axis 24. Cutting tool assembly 10 may also be moved relative to microreplication tool 46 in lateral directions (as illustrated by the horizontal arrows). At the same time, microreplication tool 46 may be rotated about axis 24. As cutting tool assembly 10 is rotated, diamond tips 14 and 18 cut into the microreplication tool 46 in an alternating manner. Accordingly, a groove is formed in a single cutting pass of cutting tool assembly 10 along microreplication tool 46. In other embodiments, microreplication tool 46 may be a planar or other non-cylindrical work piece. In addition, microreplication tool 46 may be created by moving only tool 46 or both tool 46 and cutting tool assembly 10.

Fewer passes of cutting, tool assembly 10 are needed to cut the grooves on microreplication tool 46 because the cutting tool assembly implements multiple tool shanks 12 and 16, and thus multiple diamond cutting tips 14 and 18. The groove may be a deep groove or a multi-featured groove. Some embodiments of cutting tool assembly 10 may include more than two tool shanks and two diamond tips. Multiple diamond tips may reduce production costs and speed the production cycle associated with creation of microreplication tools. Creation of a work piece can take hours if not days in some cases. Incorporation of two or more diamond cutting tips within cutting tool assembly 10 for cutting grooves can reduce the production cycle to a fraction of that time. In addition, using multiple tips to create a work piece reduces the thermal stability requirements of each tip. As tips pass through the work piece, they heat up and change shape. If this happens, later cuts of each tip will be of a different size than earlier cuts. With multiple tips, each tip may not increase in temperature, change shape, and cut different sized grooves. Alternatively, multiple tips may allow the cutting to take place quickly enough so that tip size does not have time to change shape.

For example, if the cutting tool assembly includes two tool shanks each defining a diamond cutting tip (as illustrated in FIG. 5), the number of passes required to cut grooves in microreplication tool 46 can be reduced by one-half relative to an assembly that includes a single tool shank. Additional tool shanks may add further benefits in a similar manner. Also, multiple tips may be formed on one or both of the diamonds, which may add similar productivity benefits. Reducing costs associated with the creation of the microreplication tool 46, in turn, may effectively reduce the costs associated with the ultimate creation of microreplicated structures.

Figure 6:
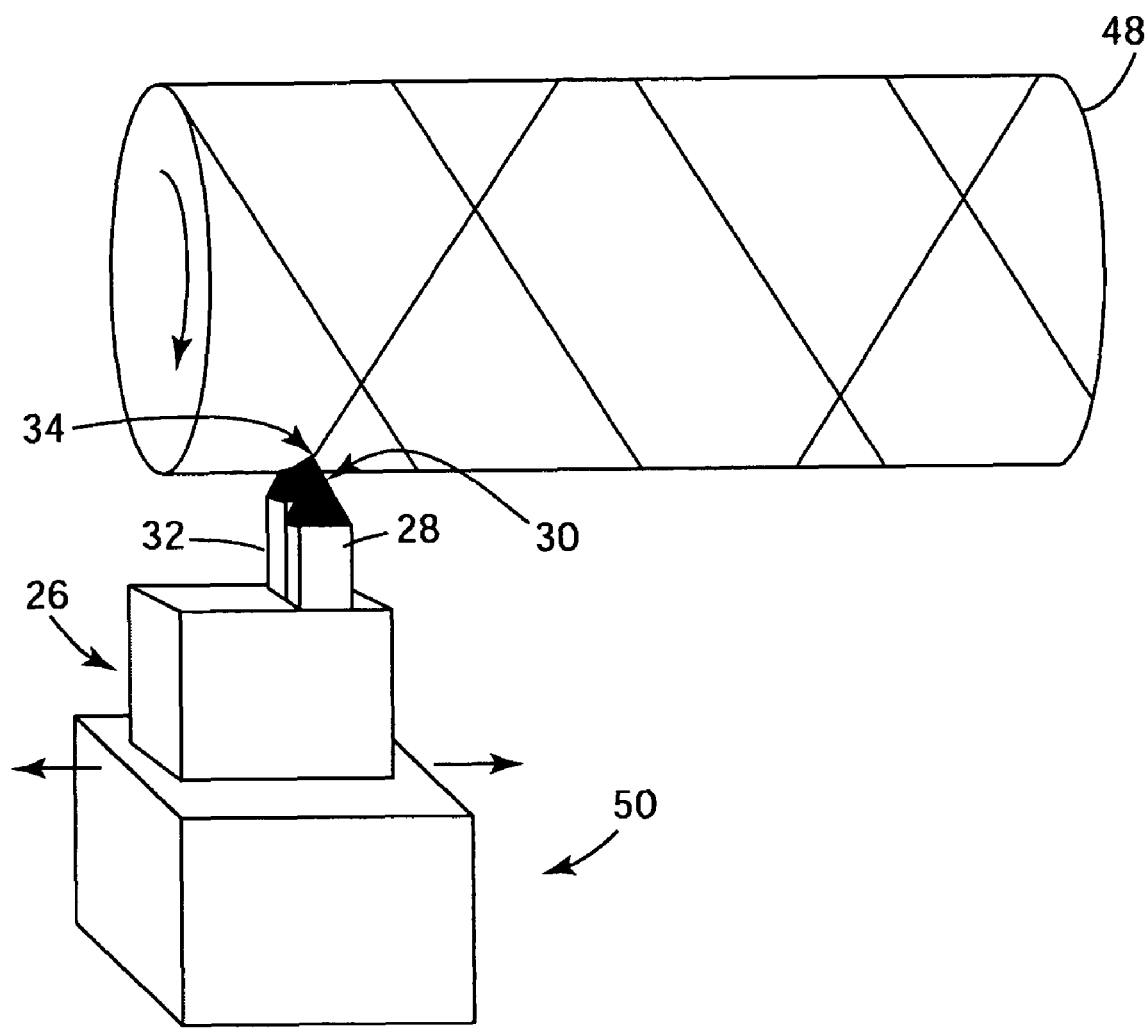
FIG. 6 is a conceptual perspective view of a multi-diamond plunge or thread cutting tool assembly cutting one groove during the creation of a microreplication tool.

FIG. 6 is a conceptual perspective view of a multi-diamond plunge or thread cutting tool assembly 26 cutting a multi-featured groove during the creation of a microreplication tool. For illustration purposes, diamond tip 30 is shown without contacting microreplication tool 48. In operation, diamond tip 30 and diamond tip 34 contact microreplication tool 48 as described. As shown in FIG. 6, cutting tool assembly 26 may be secured in a diamond tooling machine 50 that positions cutting tool assembly 26 relative to microreplication tool 48, and moves the cutting tool assembly 26, e.g., in lateral directions (as illustrated by the horizontal arrows) relative to microreplication tool 48. At the same time, microreplication tool 48 may be rotated about an axis. Diamond tooling machine 50 may be configured to pass the cutting tool assembly 26 into a rotating microreplication tool 48 via plunge or thread cutting techniques in order to cut grooves in microreplication tool 48. Alternatively, diamond tooling machine 50 may be configured for scribing or ruling, in which cutting tool assembly 26 is displaced through a work piece very slowly. In any case, deep or multi-featured grooves are cut, and protrusions can be formed on the work piece. In other embodiments, microreplication tool 48 may be a planar or other non-cylindrical work piece. In addition, microreplication tool 48 may be created by moving only tool 48 or both tool 48 and cutting tool assembly 26.

The grooves and protrusions may define the ultimate form of microreplicated structures created using the microreplication tool 48, for example, during an extrusion process. Alternatively, the formed grooves and protrusions may form other features by displacement of material in a work piece other than a microreplication tool. In addition, the use of a fast tool servo could be employed between cutting tool assembly 26 and the machine tool 50 that receives the cutting tool assembly. For example, the fast tool servo can vibrate cutting tool assembly 26 for creating of particular microstructures in microreplication tool 48.

As shown in FIG. 6, fewer passes of cutting tool assembly 26 are needed to cut the deep or multi-featured grooves in microreplication tool 48 because the cutting tool assembly implements multiple tool shanks 28 and 32, and thus multiple diamond cutting tips 30 and 34. Some embodiments of cutting tool assembly 26 may include more than two tool shanks and two diamond tips. Multiple diamond tips may reduce production costs and speed the production cycle associated with creation of microreplication tools. Creation of a work piece can take hours if not days in some cases. Incorporation of two or more diamond cutting tips within cutting tool assembly 26 for cutting grooves can reduce the production cycle to a fraction of that time. In addition, using multiple tips to create a work piece reduces the thermal stability requirements of each tip. As tips pass through the work piece, they heat up and change shape. If this happens, later cuts of each tip will be of a different size than earlier cuts. With multiple tips, each tip may not increase in temperature, change shape, and cut different sized grooves. Alternatively, multiple tips may allow the cutting to take place quickly enough so that tip size does not have time to change shape.

For example, if the cutting tool assembly includes two tool shanks each defining a diamond cutting tip (as illustrated in FIG. 6), the number of passes required to cut grooves in microreplication tool 48 can be reduced by one-half relative to an assembly that includes a single tool shank. Additional tool shanks may add further benefits in a similar manner. Also, multiple tips may be formed on one or both of the diamonds, which may add similar productivity benefits (see FIGS. 8A and 8B). Reducing costs associated with the creation of the microreplication tool 48, in turn, may effectively reduce the costs associated with the ultimate creation of microreplicated structures.

Figure 7:
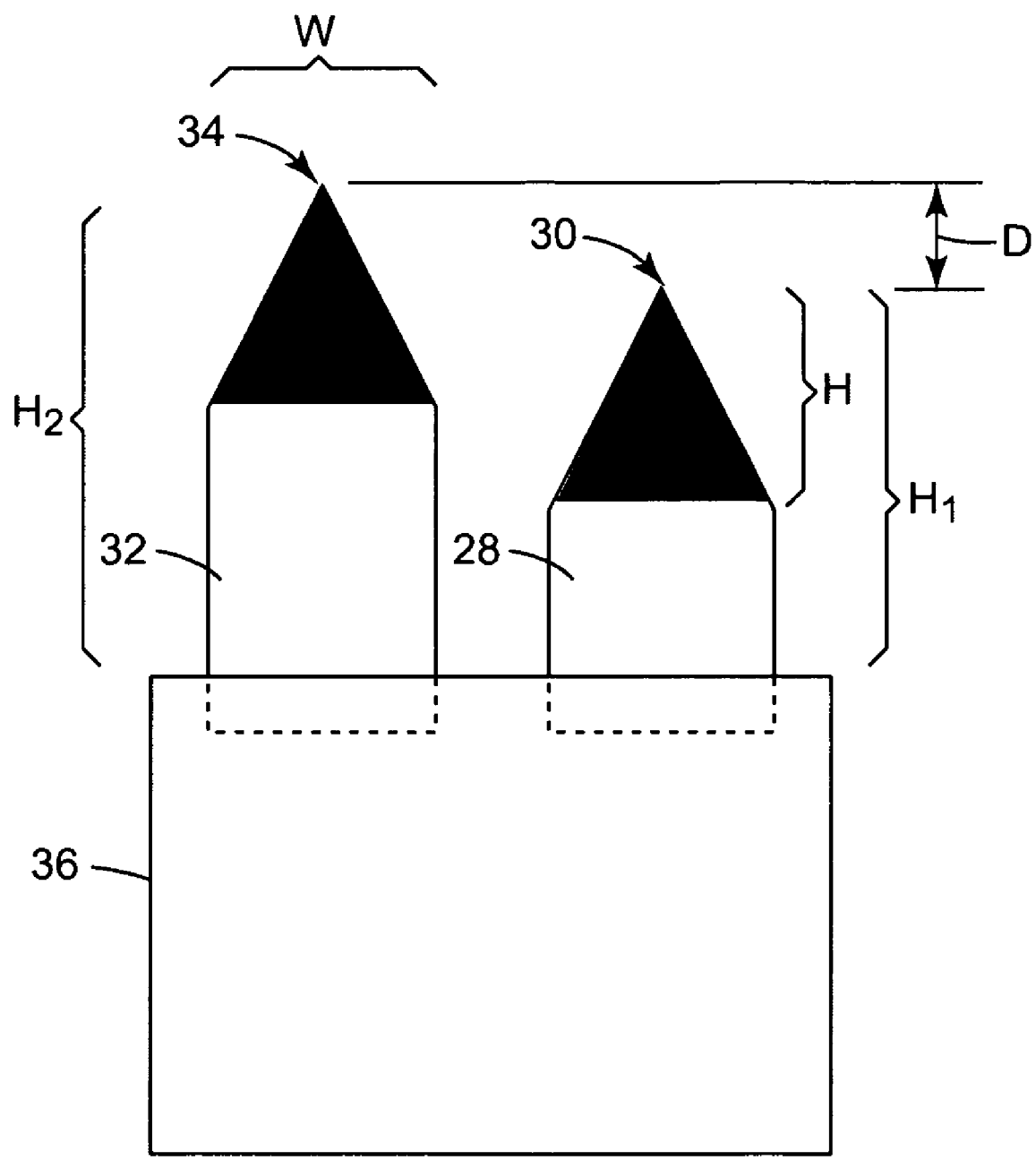
FIG. 7 is another side view of a multi-diamond plunge or thread cutting tool assembly.

FIG. 7 is another side view of a multi-diamond plunge or thread cutting tool assembly. The dimensions described with respect to tool shanks 28 and 32 and diamond tips 30 and 34 may be utilized in cutting tool assembly 10 within the description of assembly 10 related to tool shanks 12 and 16 and diamond tips 14 and 18. In the example of FIG. 7, diamond tips 30 and 34 of tool shanks 28 and 32 may also be subject to a wide variety of sizes. The sizes of the tips may be defined by one or more variables as illustrated in FIG. 7, including the cutting height (H), the cutting width (W), and the differential height (D). The cutting height (H) defines the maximum depth that the diamond can cut into a work piece, and may also be referred to as the cutting depth. The cutting width (W) may be defined as the average cutting width, or as labeled in FIG. 7, the maximum cutting width of a tip. The variable (D) refers to the depth of the next feature cut by diamond tip 34. Another quantity that can be used to define the size of the cutting tips is referred to as the aspect ratio. The aspect ratio is the ratio of height (H) to width (W). Diamond tips created by focused ion beam milling processes can achieve various heights, widths, pitches, and aspect ratios.

For example, the height (H) and/or the width (W) can be formed to be less than approximately 1000 microns, approximately 500 microns, less than approximately 200 microns, less than approximately 100 microns, less than approximately 50 microns, less than approximately 10 microns, less than approximately 1.0 micron, or less than approximately 0.1 micron. Additionally, the variable (D) may be defined to be less than approximately 1000 microns, less than approximately 500 microns, less than approximately 200 microns, less than approximately 100 microns, less than approximately 50 microns, less than approximately 10 microns, less than approximately 5 microns, less than approximately 1.0 micron, and may approach a 0.5 micron tolerance. In some cases, the distance (D) may be less than the height (H) of the diamond tip.

The aspect ratio may be defined to be greater than approximately 1:5, greater than approximately 1:2, greater than approximately 1:1, greater than approximately 2:1, or greater than approximately 5:1. Larger or smaller aspect ratios may also be achieved using focused ion beam milling. These different shapes and sizes may be advantageous for various applications.

Focused ion beam milling refers to a process in which ions, such as gallium ions, are accelerated toward the diamond in order to mill away atoms of the diamond (sometimes referred to as ablation). The acceleration of gallium ions may remove atoms from the diamond on an atom by atom basis. Vapor enhancing techniques using water vapors may also be used to improve the focused ion beam milling process. One suitable focused ion beam milling machine is the Micrion model 9500, commercially available from FEI Inc. of Portland Oreg. In general, focused ion beam milling can be performed to create precision tipped diamonds that correspond to the depths or features to be created. One exemplary provider of focused ion milling services that may be used to create one or more ion beam milled diamonds is Materials Analytical Services of Raleigh, N.C.

Focused ion beam milling is generally very expensive. Therefore, to reduce the costs associated with the creation of a multi-tipped diamond, it is desirable to initially process the diamond tip to be ion beam milled prior to submitting the diamond tip to the focused ion beam milling process. For example, less expensive techniques such as lapping or grinding may be used to remove significant portions of the diamond tip. The focused ion beam milling process may ensure that one or more of the dimensions or features listed above can be achieved. Still, by initially processing the diamond tip prior to focused ion beam milling, the amount of focused ion beam milling time required to create the final ion beam milled diamond tip can be reduced. Lapping refers to a process of removing material from the diamond using a loose abrasive, whereas grinding refers to a process in which material is removed from the diamond using an abrasive that is fixed in a medium or substrate.

Figure 8A:
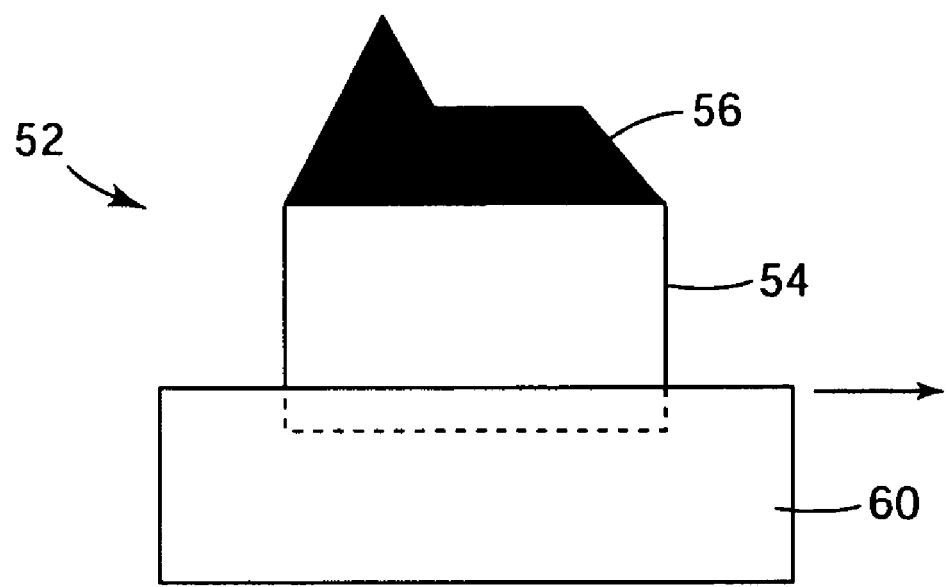
FIGS. 8A and 8B are alternative embodiments of a multi-tipped single diamond cutting tool assembly.
Figure 8B:
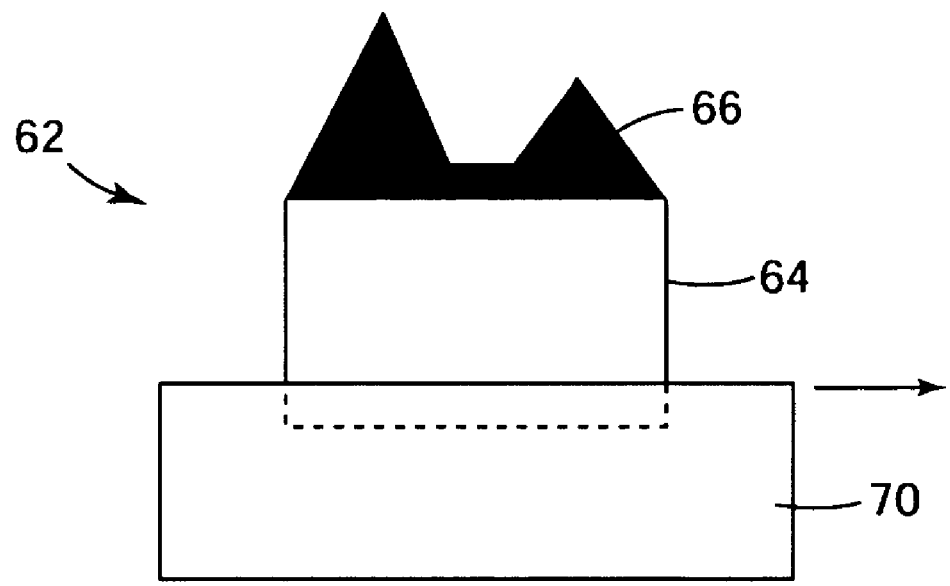

FIGS. 8A and 8B are alternative embodiments of a multi-tipped single diamond cutting tool assembly. In the example of FIG. 8A, cutting tool assembly 52 is substantially similar to cutting tool assembly 26. However, cutting tool assembly utilizes multi-tipped diamond 56 and tool shank 54 in place of two tool shanks and two single-tipped diamonds. Tool shank 54 is mounted to mounting structure 60 with techniques described herein. Cutting tool assembly 52 creates a multi-featured groove in a work piece by moving in the direction of the arrow.

Multi-tipped diamond 56 includes a flat first tip and a second higher tip to create two features. There is no gap between the first tip and the second tip. Diamond 56 may be formed into different shapes and sizes as described herein with respect to two separate diamond tips.

An alternative multi-tipped diamond is shown in FIG. 8B. Cutting tool assembly 62 includes mounting structure 70, tool shank 64 and multi-tipped diamond 66. Diamond 66 includes a first lower tip and a second higher tip, with a gap in the middle. The middle gap may be beneficial in reducing the heat of the diamond or allowing material to clear the first lower tip. Other shapes of diamond 66 are within the scope of this invention.

A multi-tipped diamond such as multi-tipped diamond 56 (FIG. 8A) or 66 (FIG. 8B) may be beneficial to the creation of a deep or multi-featured groove. Fewer tool shanks are necessary to hold multiple diamond tips, which may eliminate time, cost, and positioning error in creating a microreplication tool. In addition, the tips may be aligned to very small tolerances not subject to human error during assembly setup. In precise multi-featured grooves necessary for certain microreplicated structures, a multi-tipped diamond may be desired over separate aligned diamond tips.

The fabrication of multi-tipped diamonds 56 and 66 may be accomplished through the techniques described herein. The techniques include, but are not limited to, focused ion beam milling, lapping or grinding. In other embodiments, multi-tipped diamonds with more than two tips, slightly offset tips, and irregularly shaped tips may be used to create grooves as described herein with regard to multiple separate diamonds.

Figure 9A:
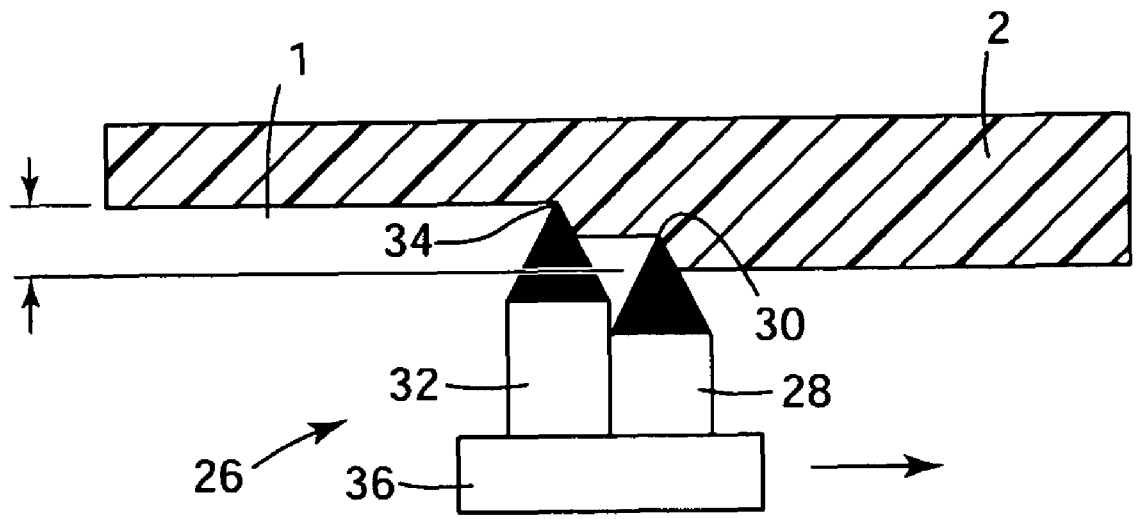
FIGS. 9A and 9B are various cross-sectional side views illustrating two different multi-diamond cutting tool assemblies cutting a deep groove into a work piece, and the resultant groove that can be formed in the work piece.
Figure 9B:
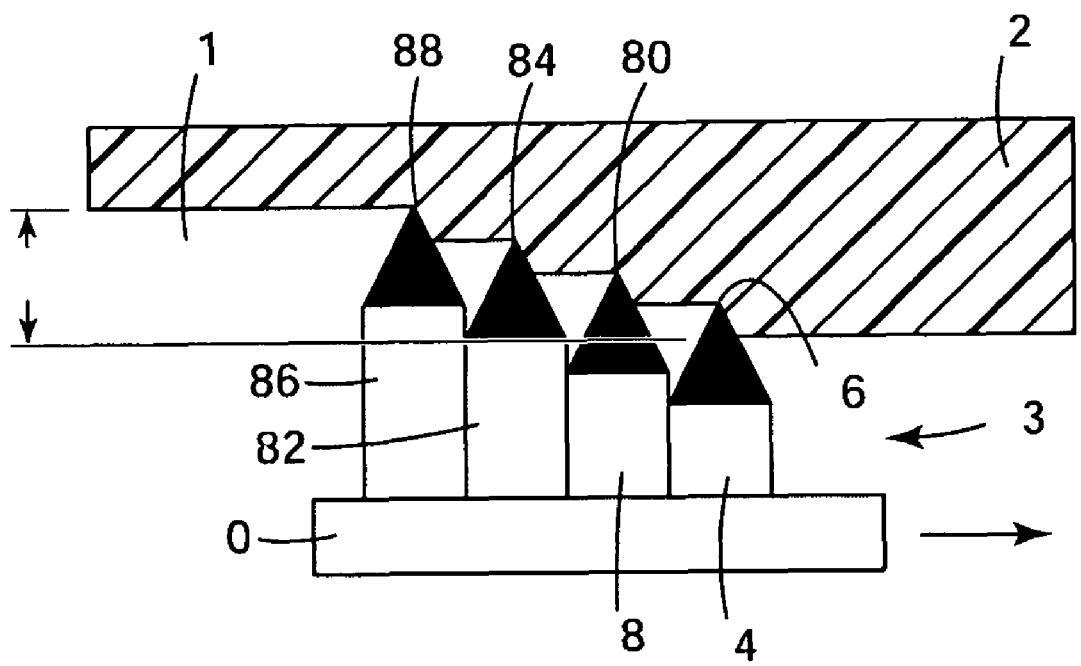

FIGS. 9A and 9B are various cross-sectional side views illustrating two different multi-diamond cutting tool assemblies cutting a groove into a work piece, and the resultant groove that can be formed in the work piece. FIG. 9A shows cutting tool assembly 26 utilizing diamond tips 30 and 34 to cut deep groove 71 into microreplication tool 72. As diamond tips 30 and 34 move through microreplication tool 72 in the direction of the arrow, groove 71 is formed to a final depth D. Depth D is the cumulative depth of material removed from microreplication tool 72. Groove 71 may also be a multi-featured groove.

In the case of cutting tool assembly 10 being used in a fly-cutting process, a similar groove may be created. As assembly 10 rotates against the work piece, diamond tip 14 performs the similar function of diamond tip 30 and diamond tip 18 performs the similar function of diamond tip 34. More tips may be utilized in creating a groove of more features, such as the groove in FIG. 9B.

FIG. 9B shows the process of creating deep groove 91 in microreplication tool 92. Cutting tool assembly 73 includes tool shanks 74, 78, 82 and 86 with respective aligned diamond tips 76, 80, 84 and 88. Each tool shank 74, 78, 82 and 86 is mounted to mounting structure 90, similar to assembly 10 or 26. Assembly 73 moves in the direction of the arrow while cutting. Cutting tool assembly 73 produces groove 91 with four features of final depth D. More or less aligned diamond tips may be used to produce more or less features in microreplication tool 92. In other embodiments, diamond tips of different shapes may be used or one or more multi-tipped diamonds may be used in assembly 73. Groove 91 may be a multi-featured groove.

Figure 10:
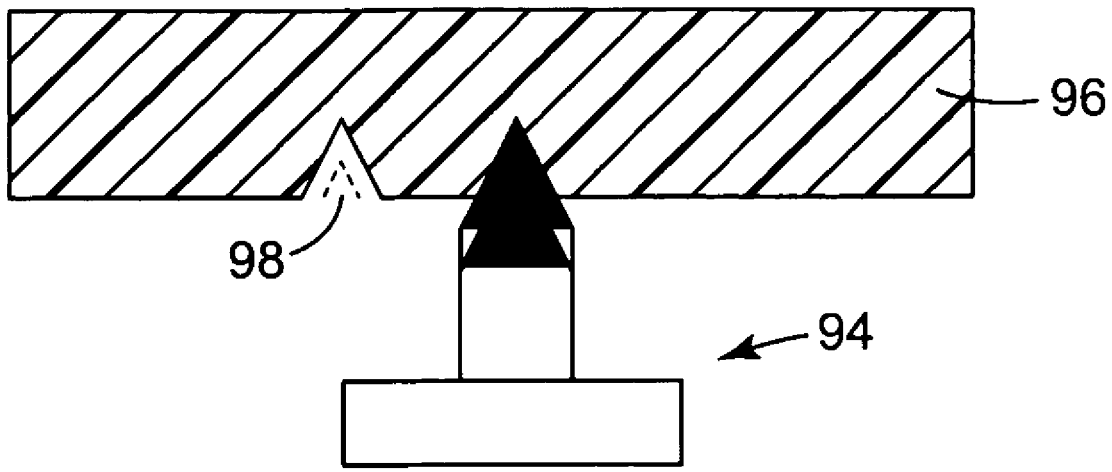
FIG. 10 is a cross-sectional top view illustrating a multi-diamond cutting tool assembly cutting grooves into a work piece, and the resultant grooves and protrusions that are formed in the work piece.

FIG. 10 is a cross-sectional top view illustrating multi-diamond cutting tool assembly cutting grooves into a work piece, and grooves and protrusions that are formed in the work piece. FIG. 10 may be representative of a multi-featured groove created by any technique including fly-cutting, plunge cutting or thread cutting. The view of FIG. 10 is showing an exemplary view straight into the cutting direction of cutting tool assembly 94 with respect to microreplication tool 96.

As cutting tool assembly 94 passes through microreplication tool 96, deep groove 98 is formed in one pass of the assembly. Groove 98 does not display indications of each depth in groove 98, but dotted lines indicate the shape of the groove after the first diamond tip cuts microreplication tool 96.

In some embodiments, the tips of assembly 94 are not shaped the same. For example, the second tip may cut a sub-feature that only changes one side of groove 98. In this case, one side of groove 98 would still be formed from the first tip while the other side of groove 98 would be changed to match the sub-feature associated to the second tip. At least some portion of the dotted lines would make up a piece of the groove 98 edge. More features may also be created, such as in FIG. 11.

Figure 11:
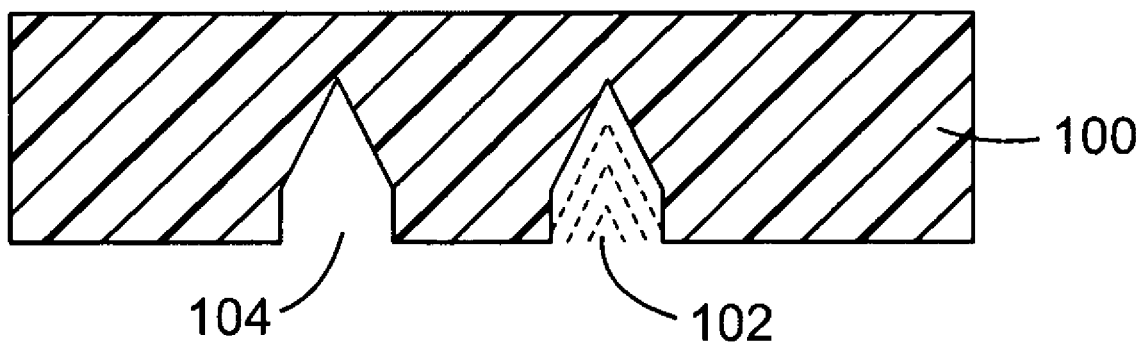
FIG. 11 is a cross-sectional top view illustrating the resultant grooves and protrusions that are formed in the work piece from a multi-diamond cutting tool assembly.

FIG. 11 is a cross-sectional top view illustrating grooves 102 and 104 and protrusions that are formed in the work piece from a multi-diamond cutting tool assembly. Both multi-featured grooves 102 and 104 have been cut into microreplication tool 100. Groove 102 shows each depth corresponding to a tip with dotted lines. The dotted lines indicate that four diamond tips created groove 102 in one pass of the associated cutting tool assembly. Groove 104 was also created similarly to groove 102 and shows the final groove without dotted lines to indicate each feature of the groove. More or less diamond tips may produce grooves of differing depth and shape, which is dependent on the diamond tips used to create the groove.

Figure 12:
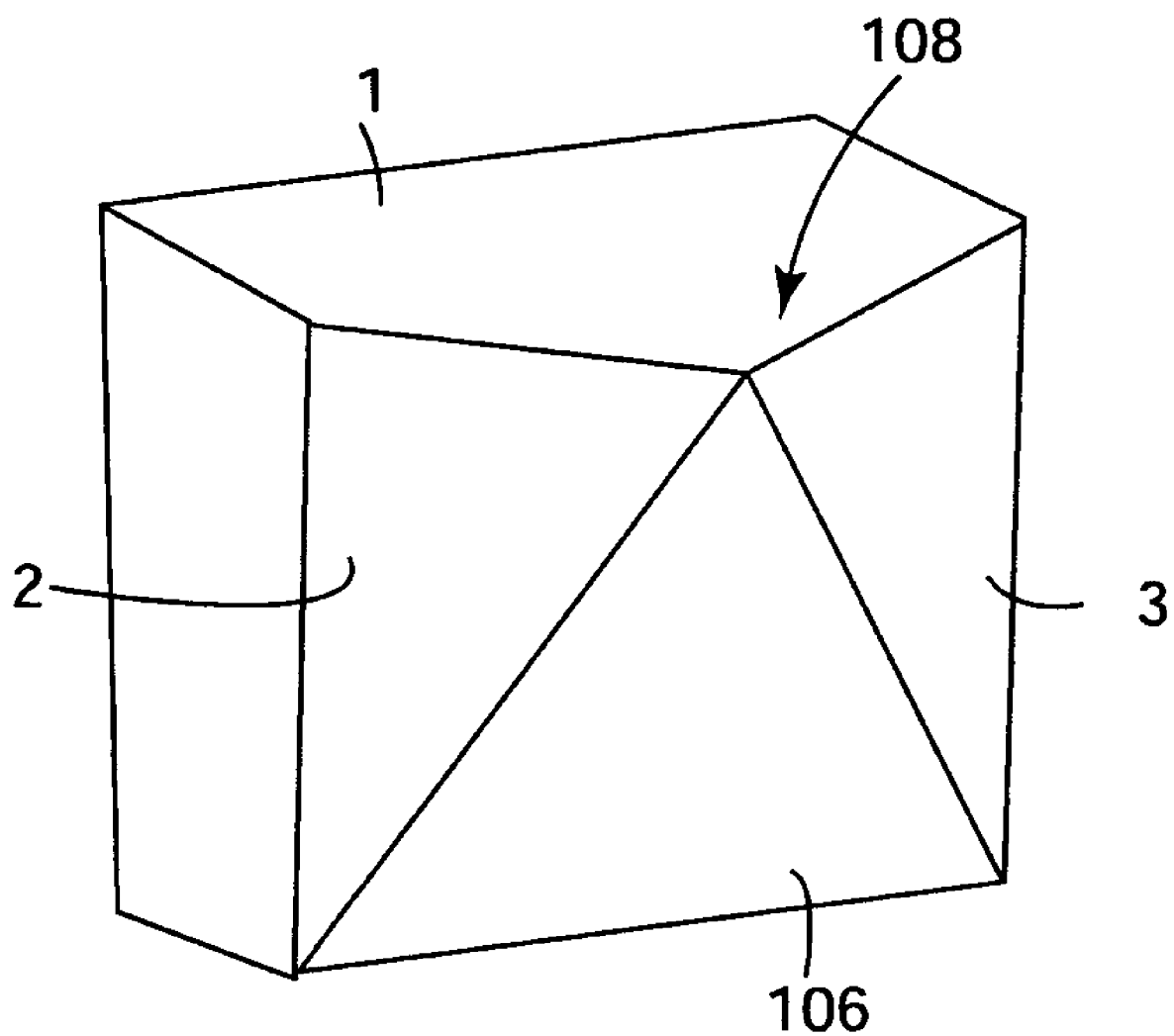
FIG. 12 is a perspective view of a diamond that can be used in a multi-diamond cutting tool assembly.

FIG. 12 is a perspective view of a diamond 106 that can be secured into a tool shank and then used in a cutting tool assembly. Diamond 106 may correspond to any of diamond tips 14, 18, 30 or 34 as described above. As shown in FIG. 12, diamond 106 may define a cutting tip 108 defined by at least three surfaces (S1-S3). Surfaces S1, S2 and S3 may be created by grinding or lapping techniques, and may be perfected by focused ion beam milling techniques.

FIGS. 13-20 are additional top views illustrating multi-diamond cutting tool assemblies according to various embodiments of the invention. FIGS. 13, 15, 17 and 19 illustrate assemblies configured for plunge cutting, thread cutting, scribing or ruling, whereas FIGS. 14, 16, 18 and 20 illustrate assemblies configured for fly-cutting. As can be appreciated by the examples of FIGS. 13-20, the tips of the diamonds in the respective tool shanks may be formed to have any of a wide variety of shapes and sizes.

Figure 13:
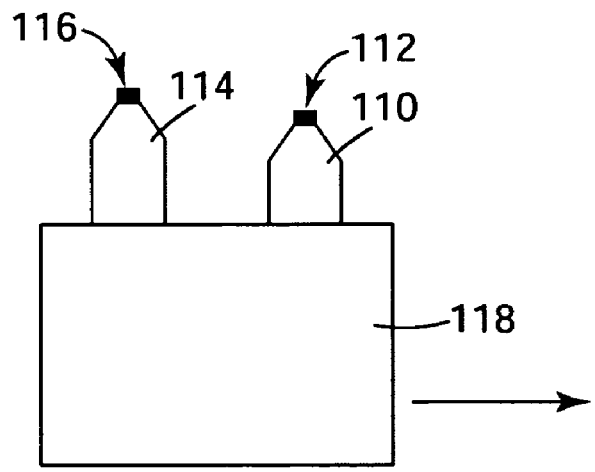
FIGS. 13-18 are additional cross-sectional top views illustrating multi-diamond cutting tool assemblies according to various embodiments of the invention.
Figure 14:
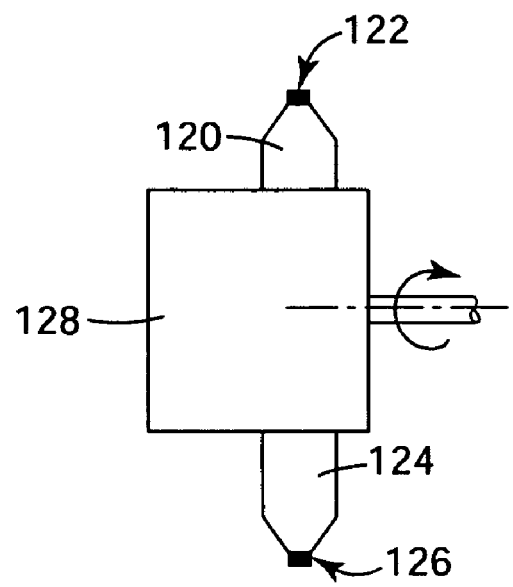
Figure 15:
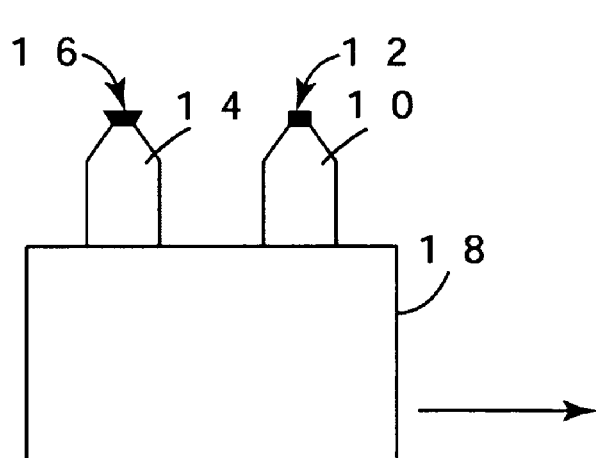
Figure 16:
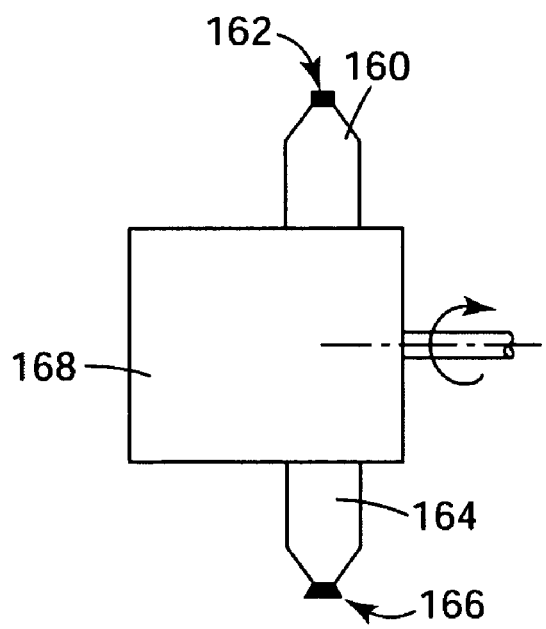

For example, as shown in FIGS. 13 and 14, diamond tips 112, 116, 122 and 126 of tool shanks 110, 114, 120 and 124 may define substantially rectangular shapes. Tips 112 and 122 cut a groove of depth D1 and tips 116 and 126, respectively, follow to deepen the groove to a depth of D2. As shown in FIGS. 15 and 16, diamond tips 152, 156, 162 and 166 of tool shanks 150, 154, 160 and 164 define different tip shapes for creating a complex or multi-featured groove. Tips 152 and 162 create a square groove of depth D1 and tips 156 and 166 follow to create an inverted cone shaped sub-feature in the groove of depth D2. As described above, the depth D2 of the sub-feature may be equal or less than depth D1. Other shapes may also create multi-featured grooves. For example, tips 156 and 166 may have an obtuse angle on one side for creating the sub-feature on one side of the original square groove.

Figure 17:
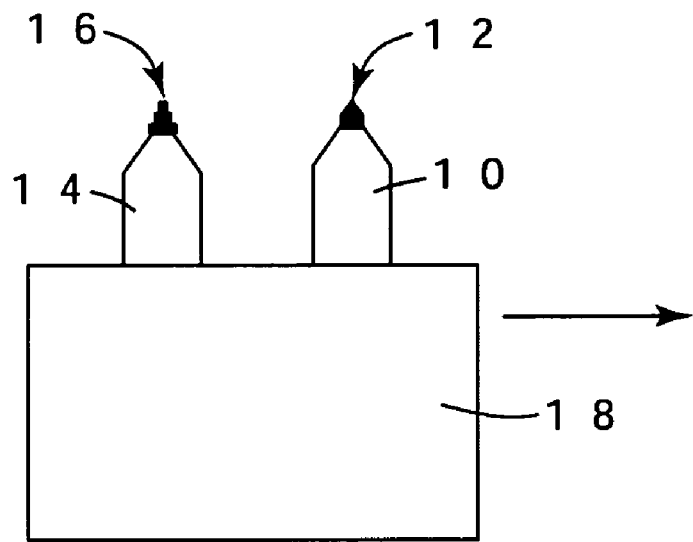
Figure 18:
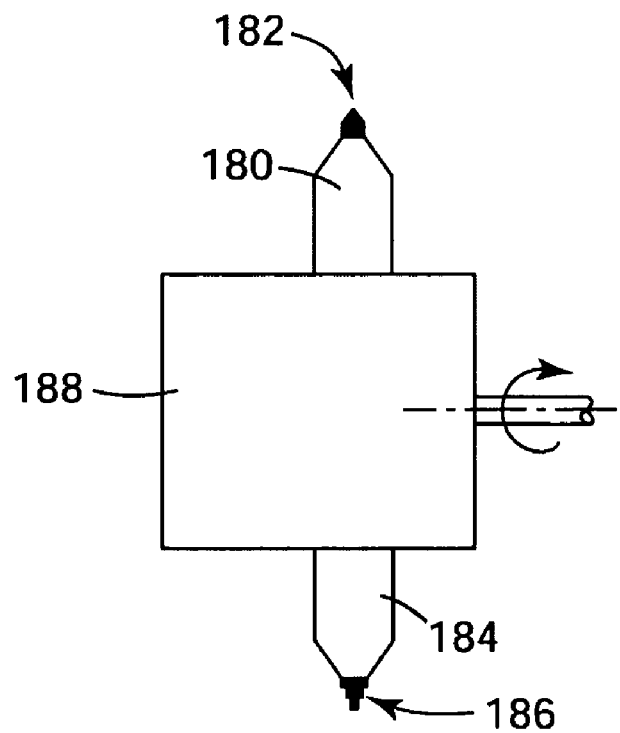

As shown in FIGS. 17 and 18, the different diamond tips 172, 176, 182 and 186 of tool shanks 170 and 174 (FIG. 17) and 180 and 184 (FIG. 18) may define different shapes and sizes. In other words, a shape of the first diamond tip 172 and 182 defined by first tool shank 170 and 180, respectively, may be substantially different from a shape of the second diamond tip 176 and 186 defined by second tool shank 174 and 184, respectively. Such a configuration may be particularly useful for the creation of optical films. In that case, the resulting multi-featured groove created in a microreplication tool may define a complex feature optical characteristic to be created in the optical film. Additional diamonds assuming various other shapes may add similar benefits. For example, the first diamond tip may cut a groove that enables the second diamond tip to enter in order to create the sub-feature which finalizes the desired groove in the microreplication tool. Tips 172 and 182 cut a groove comprising angled side walls and tips 176 and 186 cut a sub-feature of steps into the angled side walls.

Figure 19:
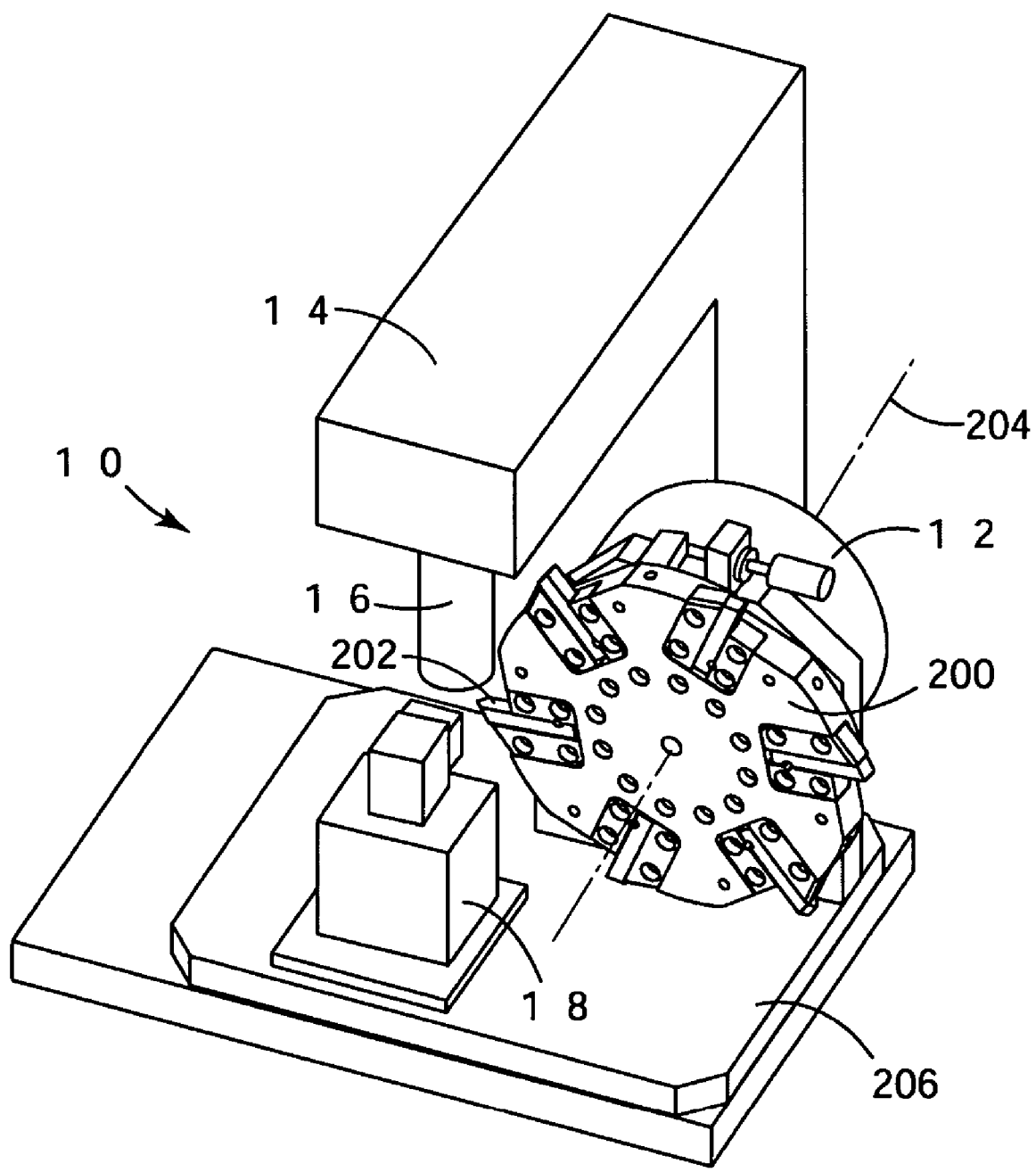
FIGS. 19 and 20 are conceptual perspective views of a multi-diamond fly-cutting rotor.
Figure 20:
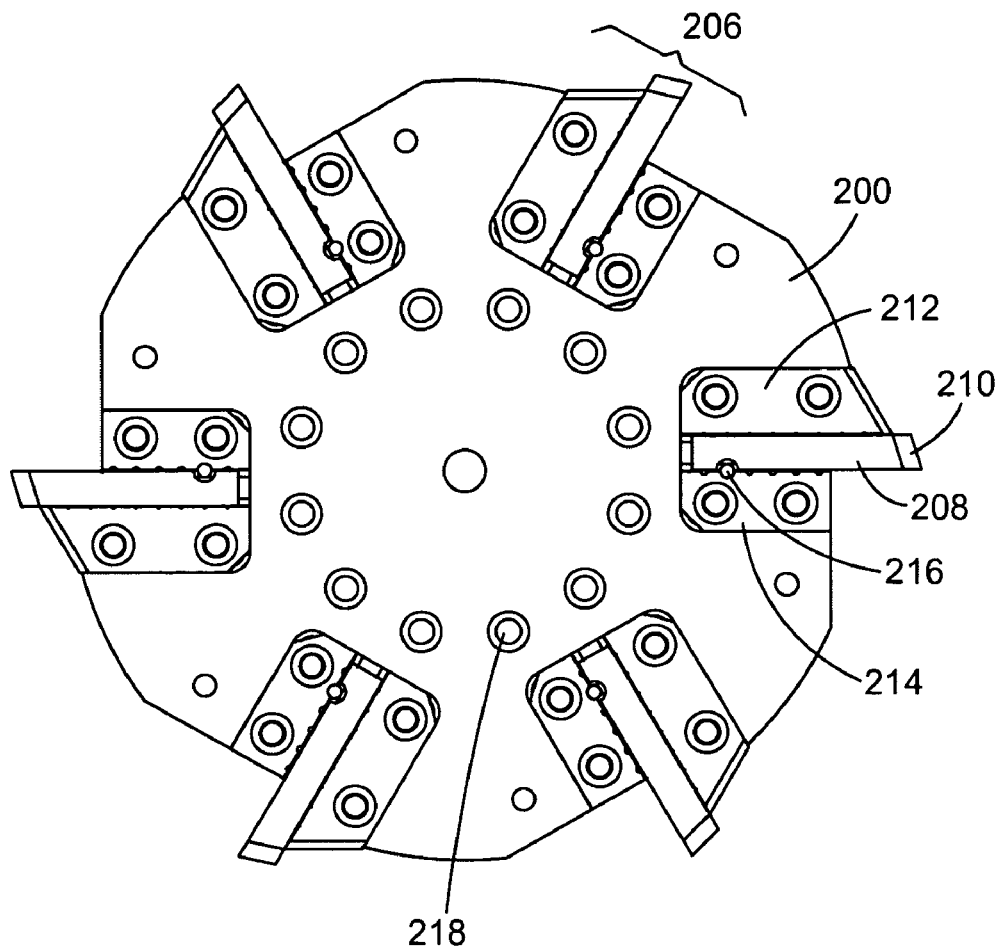

FIGS. 19 and 20 are conceptual perspective views of a multi-diamond fly-cutting rotor. In the example of FIG. 19, fly-cutting system 190 includes machinery to create a microreplication tool. Base 206 supports translation stage 198, motor 192 and fly-cutting rotor 200. Tool shank 202 includes a diamond tip for cutting the microreplication tool. Microscope 194 includes objective 196 for accurately mounting tool shank 202 and correctly aligning it with other tool shanks to be added to rotor 200. Rotor 200 spins around axis 204 which runs through the center of the rotor.

The center of rotor 200 and axis 204 is maintained relative to base 206 by a locating sphere (not shown) attached to rotor 200. The locating sphere allows a user to define the position of axis 204 on base 204 for manipulating the cutting of tool shanks mounted in rotor 200. A fine rotation adjustment is provided on rotor 200 to slowly move a tool shank into view of a microscope without adjusting the microscope. A goniometer stage is used to rotate each tool shank into correct angular alignment relative to rotor 200. In addition, a precision flexure stage may be implemented to move each tool shank in one X-Y plane, with two degrees of freedom, in order to correctly place each tool shank in rotor 200. This process may allow each tool shank 202 to be positioned in rotor 200 without the movement of translation stage 198.

Microscope 194 may be moved out of the way of rotor 200 once positioning is completed. In some embodiments, tool shank 202 may be mounted orthogonally to rotor 200 or parallel to axis 204. Each tool shank may be attached to rotor 200 with adhesive, set screws, or another fixation method. A safety pin (shown in FIG. 20) is also included to hold each tool shank in place.

Once the desired number of tool shanks is mounted to rotor 200, additional coarse adjust and fine adjust counter weights may be added to the rotor to balance the rotor for spinning at high speeds. Dummy weights may be included instead of a tool shank 202 if less than six tool shanks are required. The dummy weight may provide fine balance adjustments as well. The rotor may then be positioned appropriately to create the microreplicated tool. Tool shank 202 may include any diamond tip or multi-diamond tip described herein.

As shown in FIG. 20, rotor 200 includes six tool shank cartridges 206. Rotor 200 is conceptually similar to cutting tool assembly 10. Each tool shank cartridge comprises tool shank 208, diamond tip 210, rear support 212, front support 214, and safety pin 216. Screws 218 mount rotor 200 to motor 192 (FIG. 19).

Rear support 212 and front support 214 are held in place by screws, although any type of fixation device may be appropriate. Safety pin 216 resides within a recess of tool shank 208 to keep tool shank 208 secured to rotor 200 during rotation. Rear support 212 is shown to contact a larger area of tool shank 208 to support against tool shank 208 bending during cutting. While diamond tip 210 looks similar to every other diamond dip in rotor 200, the shapes of each diamond may be different. In addition, the height of diamond tips from the center of rotor 200 may be different to cut different features of a groove on a microreplication tool.

In other embodiments, rotor 200 may contain as few as one multi-tipped diamond or more than six aligned diamond tips as described in FIG. 20. Rotor 200 may be capable of holding more or less tool shank cartridges as necessary for creating a microreplication tool. Alternatively, rotor 200 may be used without filling each spot with a tool shank. In this case, blank cartridges may be used to balance rotor 200. Any combination of even or odd numbers of tool shank cartridges may be utilized. In some embodiments, some tool shanks may include one diamond tip whereas other tool shanks on the same rotor may include multi-tipped diamonds. Counterweight screws may be added or removed from rotor 200 to provide balanced spinning of the rotor.

Rotor 200 may be constructed of a variety of materials. The material should be capable of high stiffness and high fatigue resistance. Such materials may include but not be limited to aluminum, steel, stainless steel, titanium, or any metal alloy that may allow rotor 200 to perform its function as described. In alternative embodiments, high density plastics or composites may also be used in the construction of rotor 200. Components used with rotor 200 such as tool shank 208, rear support 212 and front support 214 may also be constructed of materials similar to rotor 200.

Figure 21:
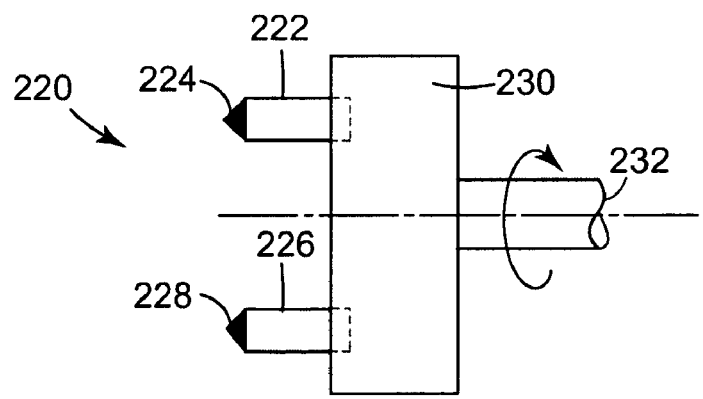
FIG. 21 is a top view of a multi-diamond cutting tool assembly configured for fly-cutting with the tool shanks mounted parallel to the axis of rotation.

FIG. 21 is a top view of an alternative embodiment of a fly-cutting tool 220. Like cutting tool assembly 10 of FIG. 1, cutting tool assembly 220 of FIG. 21 includes at least two diamond tips, e.g., diamond tips 224 and 228 of tool shanks 222 and 226, respectively. Tool shanks 222 and 226 are mounted parallel to shaft 232 or orthogonal to mounting surface 230. In addition, diamond tips 224 and 228 are aligned radially such that each diamond tip follows the same radial path with rotation of shaft 232. The resulting deep or multi-featured groove may be a circle in a microreplication tool.

Diamond tips 224 and 228 may be mounted at different heights to create a deep groove or have different shapes to create a multi-featured groove. The resulting circular groove may be created in any work piece. In some embodiments, each tool shank 222 and 226 may define two or more tips in a diamond for creating deep or multi-featured grooves. Fly-cutting tool 220 may include any other feature described herein.

A number of embodiments have been described. For example, an aligned multi-diamond cutting tool assembly has been described for use in diamond tooling machines. Nevertheless, various modifications can be made to the embodiments described above without departing from the scope of the following claims. For example, the cutting tool assembly may be used to cut grooves or other features into other types of work pieces, e.g., work pieces other than microreplication tools. Accordingly, other implementations and embodiments are within the scope of the following claims.

The invention claimed is:

1. A cutting tool assembly used for creating a micro-replication work piece that creates micro-replication structures, the cutting tool assembly comprising:
    a mounting structure;
    a first tool shank mounted in the mounting structure, the first tool shank defining a first diamond tip defining a width less than 1 mm; and
    a second tool shank mounted in the mounting structure, the second tool shank defining a second diamond tip defining a width less than 1 mm,
    wherein the first and second tool shanks are positioned in the mounting structure such that the first and second diamond tips are aligned in a cutting direction of the cutting tool assembly to within a tolerance of less than 10 microns such that when the cutting tool assembly cuts into the micro-replication work piece during a single cutting pass along the cutting direction, the first diamond tip creates a groove in the micro-replication work piece of depth D1 and the second diamond tip does at least one of the following:
    creates a deeper groove of depth D2 over the groove of depth D1, and
    creates a sub-feature of depth D2 into the groove of depth D1, wherein the groove created by the first diamond tip and the deeper groove or sub-feature created by the second diamond tip collectively define a micro-replicated feature in the micro-replication work piece, and wherein the micro-replicated feature in the micro-replication work piece defines a height and a width less than 1000 microns.

2. The cutting tool assembly of claim 1, wherein the first diamond tip creates the groove in the work piece of depth D1 and the second diamond creates the deeper groove of depth D2 over the groove of depth D1.

3. The cutting tool assembly of claim 1, wherein the first diamond tip creates the groove in a work piece of depth D1 and the second diamond creates the sub-feature of depth D2 into the groove of depth D1.

4. The cutting tool assembly of claim 3, wherein the depth D2 is less than or equal to the depth D1.

5. The cutting tool assembly of claim 1, wherein at least one of the first diamond tip and the second diamond tip define a width of less than 100 microns.

6. The cutting tool assembly of claim 1, wherein an aspect ratio of a cutting height of the first diamond tip relative to a cutting width of the first diamond tip is greater than approximately 1 to 1.

7. The cutting tool assembly of claim 1, wherein the cutting tool assembly is a fly-cutting assembly configured to rotate about an axis perpendicular to a cutting direction of the first and second diamond tips.

8. The cutting tool assembly of claim 7, wherein the first and second tool shanks extend parallel to the axis perpendicular to the cutting direction of the first and second diamond tips.

9. The cutting tool assembly of claim 7, wherein the fly-cutting assembly comprises a plurality of slots, wherein the slots accept the first and second tool shanks.

10. A method of creating a cutting tool assembly used for creating a micro-replication work piece that creates micro-replication structures, the method comprising:
    mounting a first tool shank in a mounting structure of the cutting tool assembly, the first tool shank defining a first diamond tip defining a width less than 1 mm;
    mounting a second tool shank in the mounting structure of the cutting tool assembly, the second tool shank defining a second diamond tip defining a width less than 1 mm; and
    aligning the first and second tool shanks in the mounting structure such that the first and second diamond tips are aligned in a cutting direction of the first and second diamond tips to within a tolerance of less than 10 microns such that when the cutting tool assembly cuts into the micro-replication work piece during a single cutting pass along the cutting direction, the first diamond tip creates a groove in the micro-replication work piece of depth D1 and the second diamond tip does at least one of the following:
    creates a deeper groove of depth D2 over the groove of depth D1, and
    creates a sub-feature of depth D2 into the groove of depth D1, wherein the groove created by the first diamond tip and the deeper groove or sub-feature created by the second diamond tip collectively define a micro-replicated feature in the micro-replication work piece, and wherein the micro-replicated feature in the micro-replication work piece defines a height and a width less than 1000 microns.

11. The method of claim 10, further comprising setting the first diamond tip to a height H1 above the mounting structure and setting the second diamond tip to a height H2 above the mounting structure.

12. The method of claim 11, wherein the difference between height H1 and height H2 is less than 100 microns.

13. The method of claim 10, wherein the first diamond tip creates the groove in the work piece of depth D1 and the second diamond creates the deeper groove of depth D2 over the groove of depth D1.

14. The method of claim 10, wherein the first diamond tip creates the groove in the work piece of depth D1 and the second diamond creates the sub-feature of depth D2 into the groove of depth D1.

15. The method of claim 10, wherein the mounting structure is a fly-cutting assembly configured to rotate about an axis perpendicular to a cutting direction of the first and second diamond tips.

16. The method of claim 15, further comprising mounting each of a plurality of tool shanks each defining a diamond tip within one of a plurality of slots of the fly-cutting assembly.

17. The method of claim 10, further comprising adjusting a position of at least one of the first and second tool shanks relative to one another under a tooling microscope in response to positioning feedback.

18. The method of claim 10, further comprising:
    rotating at least one of the first and second tool shanks with a goniometer to angularly align the tool shank relative to the mounting structure; and
    translating at least one of the first and second tool shanks in one plane with a precision flexure stage to position the tool shank relative to the mounting structure.

19. A cutting tool assembly used for creating a micro-replication work piece that creates micro-replication structures, the cutting tool assembly comprising:
    a mounting structure; and
    a tool shank mounted in the mounting structure, the tool shank defining a first diamond tip defining a width less than 1 mm and a second diamond tip defining a width less than 1 mm; and
    wherein the first and second diamond tips are aligned in a cutting direction of the cutting tool assembly such that when the first and second diamond tips cut into the micro-replication work piece during a single cutting pass along the cutting direction, the first diamond tip creates a groove in the micro-replication work piece of depth D1 and the second diamond tip does at least one of the following:
    creates a deeper groove of depth D2 over the groove of depth D1, and
    creates a sub-feature of depth D2 into the groove of depth D1, wherein the groove created by the first diamond tip and the deeper groove or sub-feature created by the second diamond tip collectively define a micro-replicated feature in the micro-replication work piece, and wherein the micro-replicated feature in the micro-replication work piece defines a height and a width less than 1000 microns.

20. The cutting tool assembly of claim 19, wherein the first diamond tip creates the groove in the work piece of depth D1 and the second diamond creates the sub-feature of depth D2 into the groove of depth D1.

21. The cutting tool assembly of claim 19, wherein at least one of the first diamond tip and the second diamond tip define a width of less than 100 microns.

22. The cutting tool assembly of claim 19, wherein the first and second diamond tips are aligned to within a tolerance of less than 10 microns.

23. A micro-replication system comprising:
    a micro-replication work piece used to create micro-replication structures; and
    a cutting tool assembly that creates features in the work piece wherein the features in the work piece define micro-replication features in the micro-replication structures when the micro-replication work piece is used to create the micro-replication structures, the cutting tool assembly comprising:
    a mounting structure;
    a first tool shank mounted in the mounting structure, the first tool shank defining a first diamond tip defining a width less than 1 mm; and a second tool shank mounted in the mounting structure, the second tool shank defining a second diamond tip defining a width less than 1 mm, wherein the first and second tool shanks are positioned in the mounting structure such that the first and second diamond tips are aligned in a cutting direction of the cutting tool assembly to within a tolerance of less than 10 microns such that when the cutting tool assembly cuts into the micro-replication work piece during a single cutting pass along the cutting direction, the first diamond tip creates a groove in the micro-replication work piece of depth D1 and the second diamond tip does at least one of the following:

creates a deeper groove of depth D2 over the groove of depth D1, and creates a sub-feature of depth D2 into the groove of depth D1, wherein the groove created by the first diamond tip and the deeper groove or sub-feature created by the second diamond tip collectively define at least one of the micro-replicated features in the micro-replication work piece, and wherein the micro-replicated features in the micro-replication work piece define heights and widths less than 1000 microns.

* * * * *